(12) United States Patent
Fisher et al.

(10) Patent No.: US 8,403,570 B2
(45) Date of Patent: Mar. 26, 2013

(54) PLURAL FIBER OPTIC INTERCONNECT

(75) Inventors: Lonnie L. Fisher, Hallstead, PA (US); Raymond W. Strauss, Endicott, NY (US)

(73) Assignee: Amphenol Corporation, Wallingford, CT (US)

( * ) Notice: Subject to any disclaimer, the term of this patent is extended or adjusted under 35 U.S.C. 154(b) by 540 days.

(21) Appl. No.: 12/081,054

(22) Filed: Apr. 10, 2008

(65) Prior Publication Data
US 2009/0257722 A1   Oct. 15, 2009

(51) Int. Cl.
  G02B 6/36   (2006.01)
  G02B 6/38   (2006.01)

(52) U.S. Cl. ............. 385/78; 385/70; 385/71; 385/77

(58) Field of Classification Search .......... 385/53, 385/70, 71, 76–78
See application file for complete search history.

(56) References Cited

U.S. PATENT DOCUMENTS

| | | | |
|---|---|---|---|
| 4,611,887 A * | 9/1986 | Glover et al. .............. | 385/71 |
| 5,018,822 A | 5/1991 | Freismuth et al. | |
| 5,287,425 A | 2/1994 | Chang | |
| 5,436,993 A | 7/1995 | Antonini et al. | |
| 5,590,229 A | 12/1996 | Goldman et al. | |
| 5,984,531 A | 11/1999 | Lu | |
| 6,217,230 B1 * | 4/2001 | Matsushita .............. | 385/78 |
| 6,302,591 B1 * | 10/2001 | Nagaoka et al. .......... | 385/59 |
| 6,464,403 B1 | 10/2002 | Koch et al. | |
| 6,572,276 B1 * | 6/2003 | Theis et al. ............... | 385/78 |
| 6,579,014 B2 | 6/2003 | Melton et al. | |
| 6,685,361 B1 | 2/2004 | Rubino et al. | |
| 6,811,321 B1 | 11/2004 | Schmalzigaug et al. | |
| 7,011,454 B2 * | 3/2006 | Caveney et al. .............. | 385/87 |
| 7,244,066 B2 * | 7/2007 | Theuerkorn .............. | 385/53 |
| 7,318,677 B2 | 1/2008 | Dye | |
| 7,651,278 B2 * | 1/2010 | Kiani et al. ................ | 385/78 |
| 2003/0165300 A1 | 9/2003 | Greub et al. | |
| 2005/0135753 A1 | 6/2005 | Eigenmann et al. | |
| 2005/0259924 A1 | 11/2005 | Krahenbuhl et al. | |
| 2006/0018603 A1 | 1/2006 | Greub et al. | |
| 2006/0159402 A1 | 7/2006 | Ammer et al. | |

FOREIGN PATENT DOCUMENTS

| | | |
|---|---|---|
| EP | 1478959 | 11/2004 |
| EP | 1483610 | 12/2004 |
| EP | 1543365 | 6/2005 |
| EP | 1649312 | 4/2006 |
| WO | WO-03/071329 | 8/2003 |
| WO | WO-03/076997 | 9/2003 |
| WO | WO-2004/027482 | 4/2004 |
| WO | WO-2005/010584 | 2/2005 |
| WO | WO 2006069093 A1 * | 6/2006 |

* cited by examiner

*Primary Examiner* — Daniel Petkovsek
(74) *Attorney, Agent, or Firm* — Blank Rome LLP (57) ABSTRACT

A fiber optic connector for connecting a plurality of optical fibers comprising a plurality of fiber optic assemblies, each assembly including at least one optical fiber coupled to a ferrule, the ferrule being coupled to a spring. A connector housing is configured to support the plurality of optical fibers. The connector housing includes first and second mating connector portions. A plurality of channels support each of the plurality of fiber optic assemblies, respectfully, disposed between the first and second mating connector portions. A plurality of apertures are formed in at least one of end the housing. The plurality of fiber optic assemblies are supported between the first mating connector portion and the second mating connector portion by the channels such that the springs are disposed between the first and second mating connector portions and the ferrules of the plurality of fiber optic assemblies extend through the apertures at the one end of the connector housing in a spring loaded fashion.

16 Claims, 10 Drawing Sheets

PLURAL FIBER OPTIC INTERCONNECT

FIELD OF THE INVENTION

The present invention relates to the field of fiber optics. More specifically, the present invention is directed to a fiber optic connector for simultaneously connecting a plurality of fiber-optic cables and methods of making a connection with such a fiber optic connector.

BACKGROUND OF THE INVENTION

Traditionally, communication transmissions have occurred through transmission of signals on electric cabling. Fiber-optic networks are increasingly being used in place of traditional electronic cabling, because of their high transmission capacity and their reduced capacity for incorporating interference. Such fiber-optic cables are used, for example, in the communications infrastructure of buildings and other enterprises. To facilitate the use of optical fiber cabling, it is important to have connectors that are reliable, easily releasable and easy-to-handle. The number of cables to be inter connected has increased as communications and bandwidth growth has occurred and an increasing number of such connectors must be accommodated in existing spaces. Also, so systems that accommodate different types of cabling, e.g. fiber optic and/or electric, are desirable.

The prior art has disclosed many types of connectors for fiber optic cables. See for example, U.S. Pat. Nos. 7,318,677; 6,811,321; 6,464,403; 5,984,531 and 5,287,425; and U.S. Patent Application Publication Nos. 2005/0135753 and 2003/0165300, each of which is herein incorporated by reference A need exists, however, for a system and a method for connecting multiple optical fibers together using a simple and easy-to-use connector, that is rugged and less prone to environmental factors. Such a connector system should, preferably, be expandable so that different numbers of optical fibers can be connected using the same connector. Such a system should, preferably, also accommodate electrical connections in addition to fiber optic connections, so that single lines can replace multiple existing lines, where some of the replaced lines must remain electrical and not switched over to optical fiber.

SUMMARY OF THE INVENTION

Accordingly, the present invention involves a fiber optic connector for connecting a plurality of optical fibers that includes a plurality of fiber optic assemblies, each assembly including at least one optical fiber coupled to a ferrule, and a plug housing that is configured to support the optical fibers. The plug housing includes first and second mating plug portions, a plurality of channels supporting each of the plurality of fiber optic assemblies respectfully, disposed between the first and second mating portions, and a plurality of apertures in at least one of the first and second mating plug portions. The fiber optic assemblies are supported between the first plug portion and the second plug portion by the channels such that the ferrules of the fiber optic assemblies extend through the apertures at the one end of the plug housing in a spring loaded fashion.

The present invention also relates to a method of connecting a plurality of fiber-optic cables to a socket that comprises of assembling a plurality of fiber optic assemblies by, placing a spring on at least one optical fiber of the plurality of optical fibers, inserting a prepared end of the optical fiber into a rear end of a ferrule holder, sliding the spring over the rear end of ferrule holder, inserting a ceramic ferrule into a front end of the ferrule holder over the optical fiber, and repeating for the remaining optical fibers. The method also includes the steps of inserting the ferrules of the plurality of fiber optic assemblies into a plurality of corresponding apertures at one end of the plug housing, sliding the optical fibers of the plurality of fiber optic assemblies into a plurality of corresponding apertures in the other end of the plug housing, with each optical fiber being placed at a predetermined position in the apertures, and plugging the plug housing into a socket to connect the plurality of optical fibers to mating optical fibers in the socket.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention facilitates the connection of multiple optical fibers together using a simple and easy-to-use connector, that is rugged and less prone to environmental factors. The present invention is also expandable so that different numbers of optical fibers can be connected using the same connector and not require relearning on the part of the technician just because a different number of optical fibers are being connected. The present invention can accommodate electrical connections, as well as fiber optic connections, including shielding, so that lines in existing establishments can be replaced, even where some of the replaced lines must remain electrical and not switched over to fiber. The present invention utilizes a number of optical fibers, where the number is greater than or equal to two.

Figure 1:
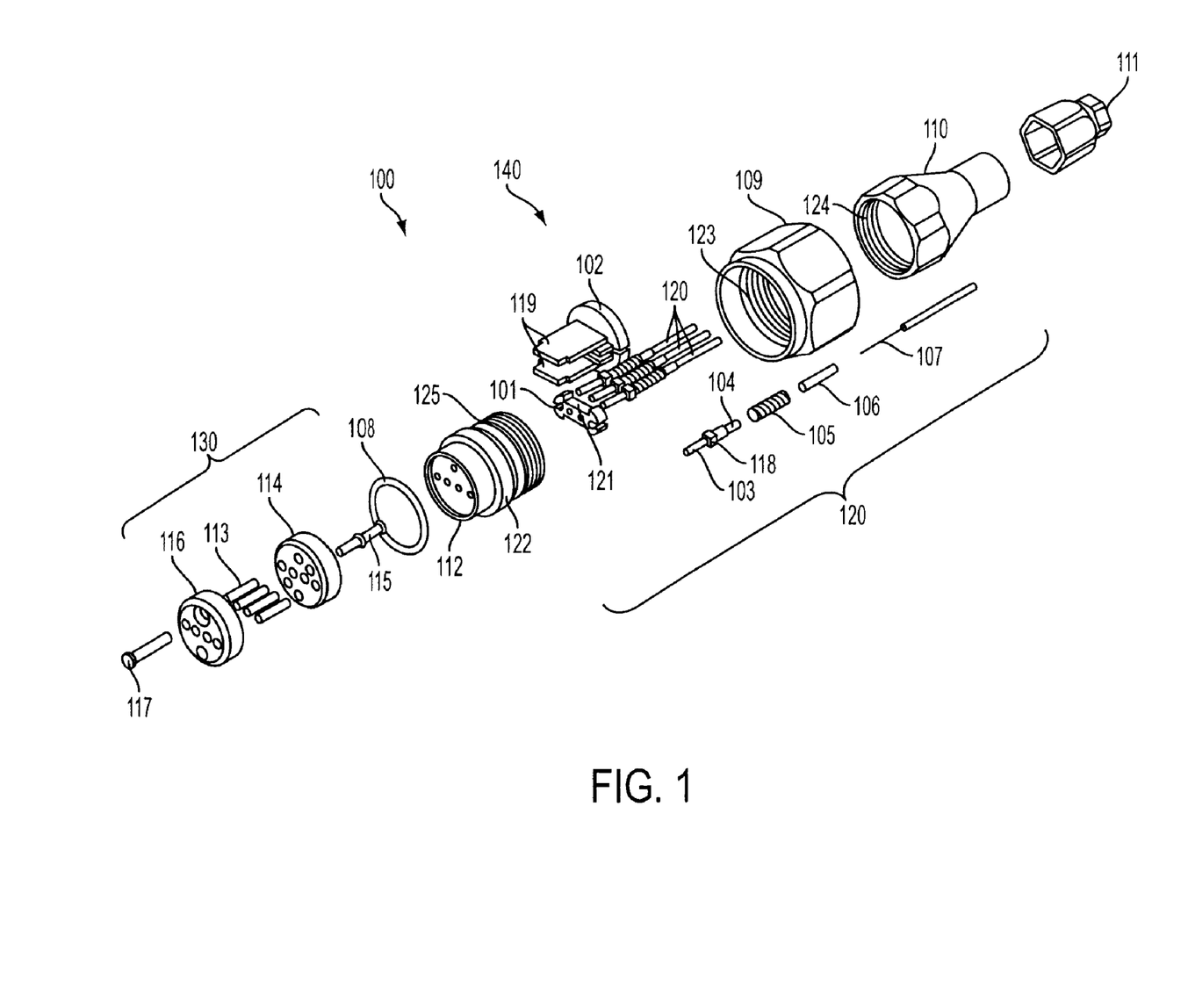
FIG. 1 is an exploded view of a connector according to a first embodiment of the present invention.
Figure 2A:
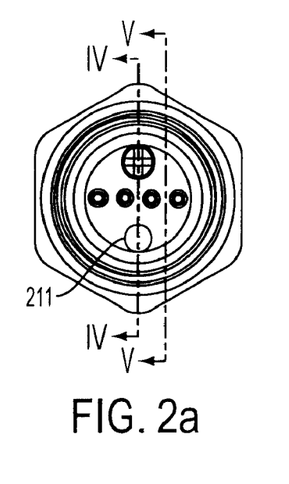
FIGS. 2(a) and 2(b) are front and side views, respectively of the assembled connector, according to the first embodiment of the present invention.
Figure 2B:
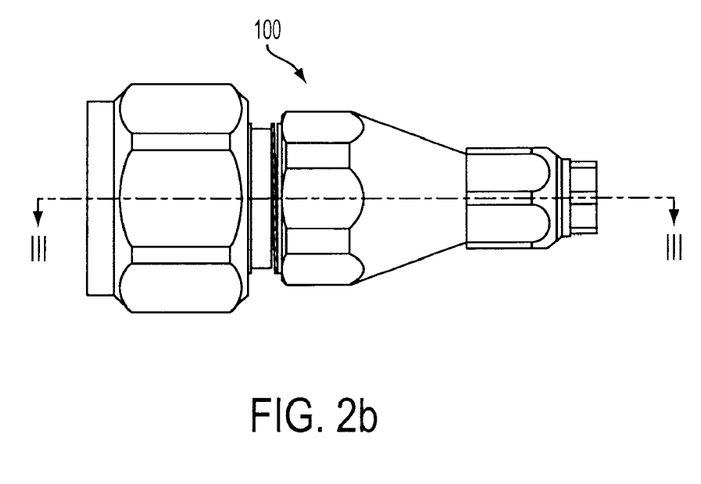
Figure 6A:
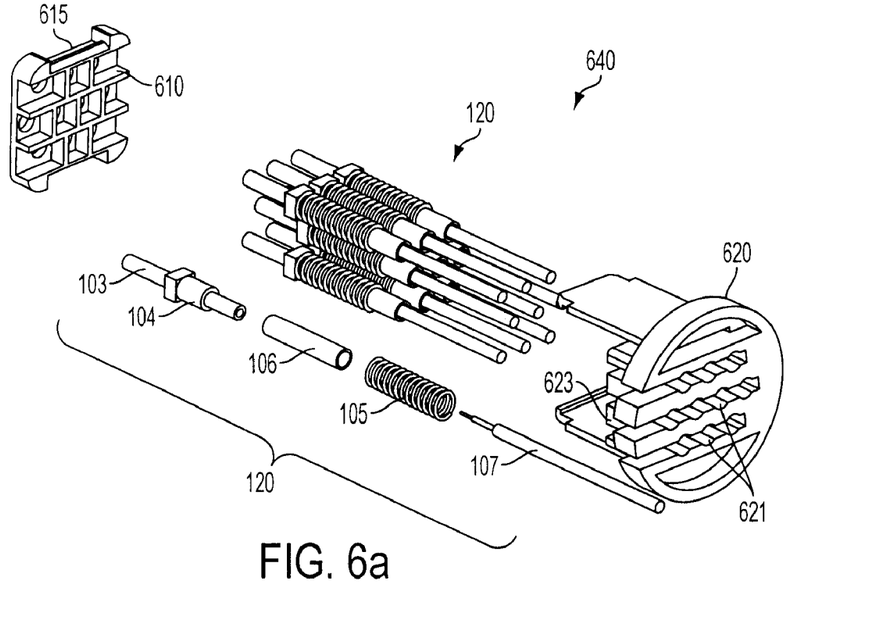
FIGS. 6(a) and 6(b) provide exploded views of a connector according to a second embodiment of the present invention.
Figure 6B:
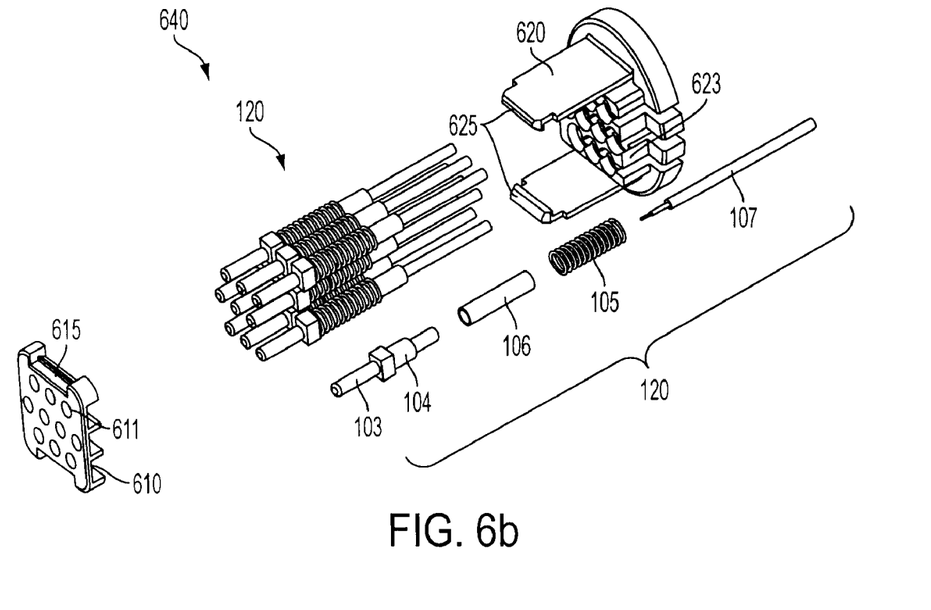

A first embodiment of a connector 100 in accordance with the present invention is illustrated in FIG. 1. The fibers may be prepared and assembled as single subassemblies 120 prior to installation into the connector 100. Each subassembly 120 includes an individual optical fiber 107 that is prepared by removing its outer protective sheaf to a predetermined length exposing the fiber. The exposed fiber is introduced into a tube 106 and the tube 106 is fit to one end of a ferrule holder 104. Prior to fitting the tube 106 onto one end of the ferrule holder 104, the tube 106 is introduced through the center of a spring 105. Tube 106 is an optional component and may be omitted without deviating from the invention. The ferrule holder 104 has a stop at one end with a circumferential shoulder 118 which the spring 105 abuts. As seen in FIGS. 1 and 6, the shoulder 118 has a substantially square shape. The other end of the ferrule holder 104 accommodates a ceramic ferrule end 103 with a through hole, through which the predetermined length of the exposed optical fiber 107 fits. The ferrule end 103 receives and aligns the optical fiber 107 so that light may be introduced therethrough, which mate and create the coupling of the light signals. The ferrules are prepared by applying epoxy and by cutting and polishing to align and hold the optical fiber therein. Alternatively, the ceramic ferrule and ferrule holder are one integral unit and the tube is omitted.

After each fiber optic subassembly 120 is assembled, the ferrule ends 103 of the fiber optic subassemblies 120 may be introduced into a plug housing including a front plug 101 and a rear plug 102 (FIG. 1). The circumferential shoulders 118 of the ferrule holders 104 abut against the front plug 101. The front plug 101, in this embodiment, has a plurality of apertures, where each aperture receives one of the fiber optic subassemblies 120. After all of the subassemblies 120 are accommodated in the front plug 101, the fiber optic subassemblies are fitted into the rear plug 102. The rear plug 102 has slots and apertures which accommodate the ends of the fiber optic subassemblies 120.

The front and rear plugs include mating engagement members which allow coupling of the front and rear plugs to form the plug housing. For example, the rear plug 102 may have two opposing tabs 119 that fit into recesses 121 in the front plug 101 to hold the two together, such as by a snap fit engagement. The mated front and rear plugs 101 and 102 form channels 126 (FIG. 3) therebetween that each support a subassembly 120. The springs 105 of the fiber optic subassemblies 120 also abut a rear wall of the rear plug 102, so as to spring load the ferrule holders 104 of the subassemblies 120 between the rear wall of the rear plug 102 and the front plug 101 and so that the ferrule ends 103 extend beyond the faceplate of the front plug 101 and can be pressed towards the faceplate in a spring-loaded fashion.

Components 101, 102 and 120 are assembled prior to installation into the connector 100 to form a plug assembly 140. A backshell 110 holds the plug assembly 140 in place. The backshell 110 attaches to the connector body front piece 112 through a threaded connection. The ferrule ends 103 of the fiber optic subassemblies 120, which extend beyond the faceplate of the front plug 101, pass through horizontally aligned holes of the connector body 112.

Figure 3:
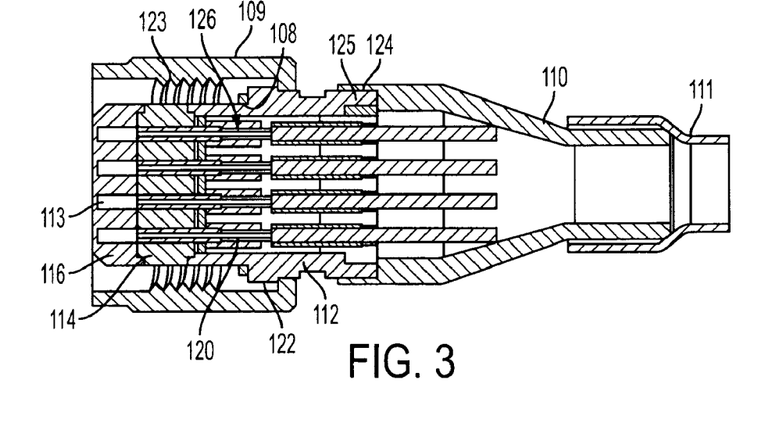
FIG. 3 is a cross-sectional view of the assembled connector in FIG. 2(b) through the intersection line III-III, according to the first embodiment of the present invention.

The connection of the backshell 110 to the connector body 112 is shown in greater detail in FIG. 3. A coupling nut 109 is fitted to an outer ridge 122 of the connector body 112, such that it cannot pass over the outer ridge 122 before the assembled fiber optic subassemblies 120 are inserted. The inner diameter 123 of the coupling nut 109 is threaded, in one embodiment, to achieve a threaded attachment to another piece, such as the socket containing the mating fibers, where the o-ring 108 mediates the connections and weatherizes it. Other types of known attachments may can be employed, such as a bayonet, latch, or push-pull. The backshell 110 has internal threads 124 which couple threads 125 on the rear end of the connector body 112.

The connector may also include, in some embodiments, first and second inserts 114 and 116 which attach to the connector body 112 through a screw 117, that passes through both of the inserts. These parts make up a protective guide cap subsection 130 that can facilitate access to the fibers for cleaning and also provides a polarization feature. The screw 117 also acts as a guide to assemble the first 116 and second 114 inserts with the connector body 112. A pair of screws 115 hold the inserts 116 and 114 together. Other mechanisms may also be used to hold the parts together, such as ultrasonic bonding, welding and/or glue. When the subsection 130 is not used, sleeve 113 is assembled to the fiber optic subassemblies 120 after the front plug 101 is in place and prior to sliding into the receiving holes of the connector body 112.

Figure 4:
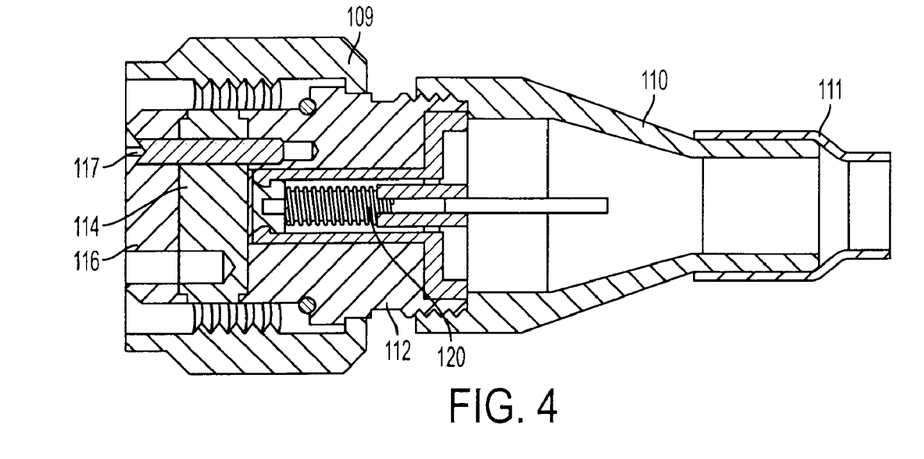
FIG. 4 is a cross-sectional view of the assembled connector in FIG. 2(a) through the intersection line IV-IV, according to the first embodiment of the present invention.
Figure 5:
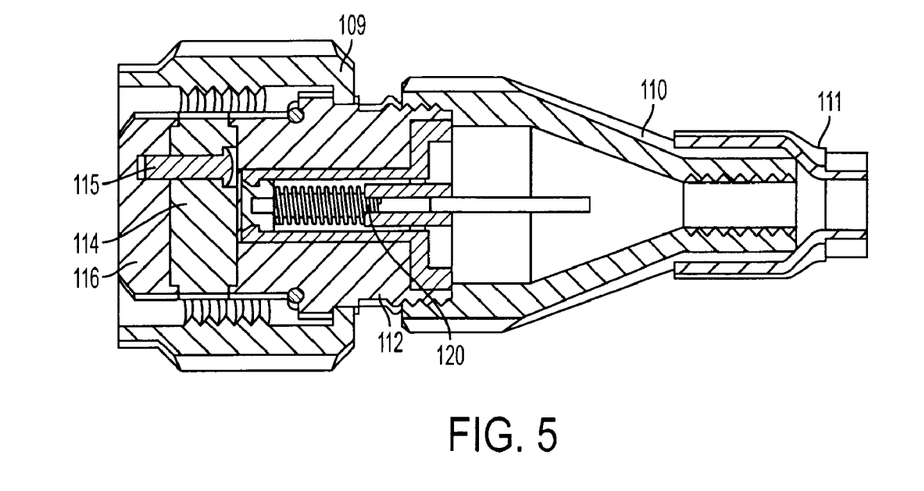
FIG. 5 is a cross-sectional view of the assembled connector in FIG. 2(a) through the intersection line V-V, according to the first embodiment of the present invention.

FIG. 4 further illustrates how the screw 117 passes through insert 116 and the insert 114 and FIG. 5 further illustrates the coupling of the insert 116 and the insert 114 through the drive screw 115, with one illustrated in the cross-section. As discussed above, other attachment methods can also be used to achieve coupling of the above-discussed parts.

The present invention, through these optional first and second inserts, 114 and 116, allows access to the fibers for cleaning. This cleaning can be accomplished while the fibers are still embedded within the connector body, as discussed above. This is accomplished by removing the protective guide cap subsection 130, which includes elements 113 through 117. The removal of the protective guide cap assembly exposes the ferrule ends 103 of the fiber optic assembly for cleaning. The removal is accomplished by removing the screw 117 and then removing the inserts, 114 and 116, and guide sleeves 113. With the connection of the drive screws 115, the inserts and the guide sleeves can be removed as a single piece.

FIGS. 4 and 5 also illustrate the attachment of a crimp ring 111 to the backshell 110. It should be noted that the present invention encompasses the use of either a mechanical or molded backshell, which depends on the application for use.

The backshells also provide the benefit that the grounding of the cable shield can be continued to the connection. This is important to the additional embodiments discussed below.

The present invention is also drawn to a connector that can accommodate both fiber optic and metal/electrical connections. Such metal/electrical connections can be achieved through soldered or crimped contacts or conductors, generally made from copper and copper alloys. In such an embodiment, one or more of the fiber optic subassemblies 120 is replaced by an electrical conductor or connection, thereby allowing for multiple types of connections to be achieved in the same connector.

Additionally, it should be emphasized that while the four position connector has been described above, the connectors of the present invention are not so limited. Other configurations for the fiber connections can be made using the fiber optic subassemblies 120. For example, the rear plug 102 and the front plug 101 may be reconfigured so that the ferrule ends 103 have a "pin out" that is a two-by-two square configuration. The fiber optic subassemblies 120 would remain the same and be placed in front plug according to the design of the connector. The holes in the front plug 101 can have any configuration, including arrays of rows and columns, circular configurations and configurations have asymmetry as a keying feature to aid in achieving a single orientation connection.

Figure 7A:
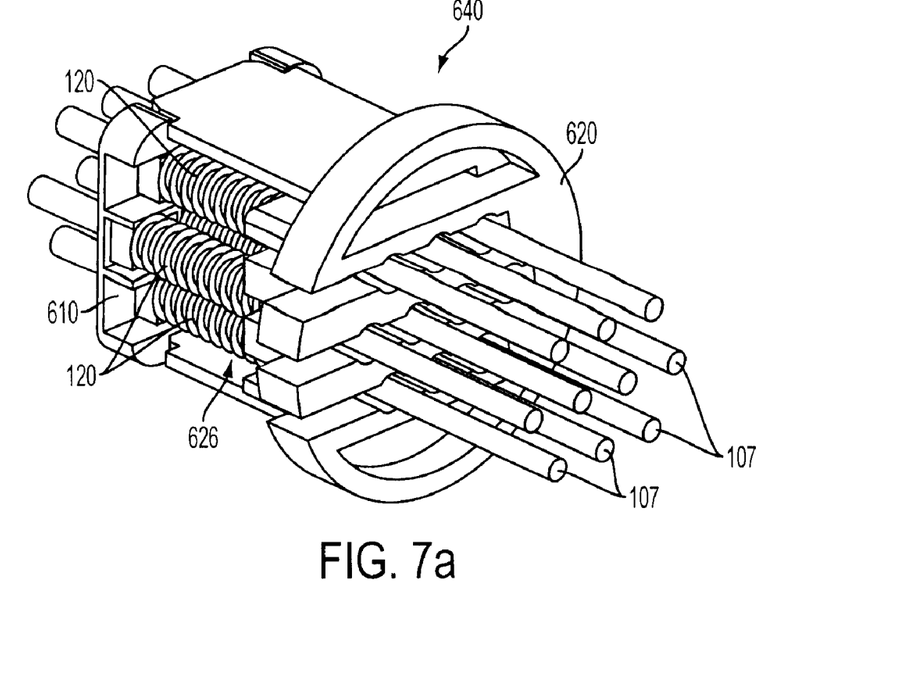
FIGS. 7(a) and 7(b) provide assembled views of a connector according to the second embodiment of the present invention.
Figure 7B:
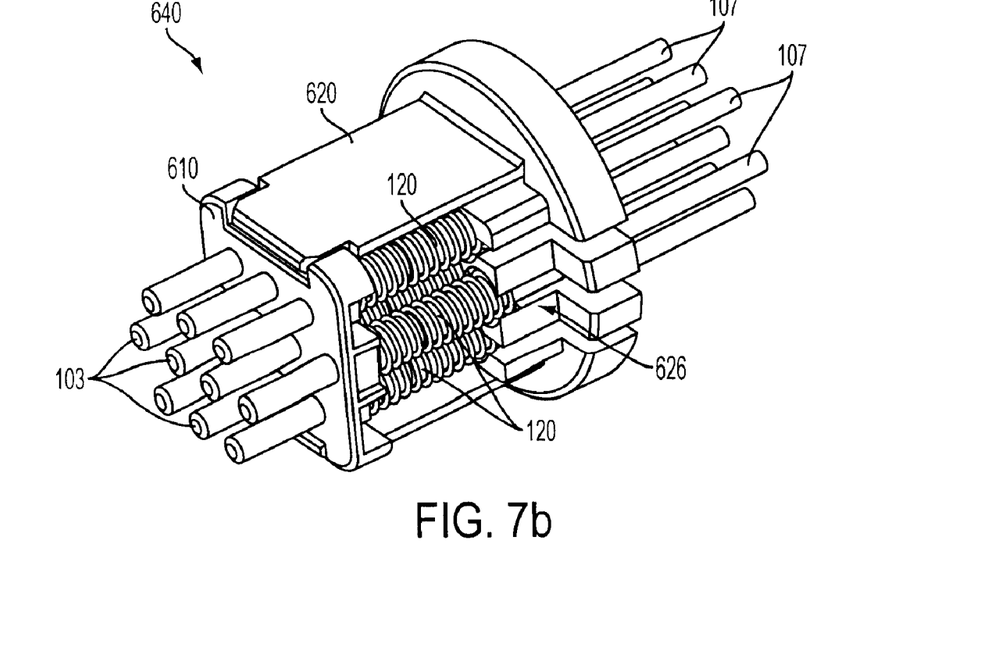

One such embodiment is illustrated in FIGS. 6(a), 6(b), 7(a) and 7(b). The fiber optic subassemblies 120 are configured as described above and are fitted into a plug housing in an opening thereof between a front plug 610 and a rear plug 620, as seen in FIGS. 7(a) and 7(b). The front plug 610 illustrated has apertures 611 oriented into a three-by-four-by-three array of apertures to accommodate a three-by-four-by-three array of the fiber optic subassemblies. At least one of the walls of the apertures 611, as seen in FIG. 6a, provides an abutment wall that abuts the shoulder 118 of the fiber optic assembly 120 to prevent it from rotating with respect to the plug 610, thereby locking it into the housing. Each aperture cell has a guide to facilitate insertion. Each row of fiber optic subassemblies 120 is accommodated in a slot 621 in a rear plug 620. Each optical fiber extends beyond the rear of the rear plug 620, as seen in FIGS. 7(a) and 7(b). The rear plug 620 may have multiple stops 623 which receive the tubes 106 and abut the springs 105 of the subassemblies. The front and rear plugs 610 and 620 may have engagement members to form the plug housing. For example, the rear plug 620 may have opposing tabs 625 that are received by notches 615 on the front plug 610, that holds the plug assembly 640 together. The mated front and rear plugs 610 and 620 form channels 626 (FIGS. 7(a) and 7(b)) that receive the individual subassemblies 120. The plug assembly 640 is assembled with the connector 100 in the same manner described above with respect to plug assembly 140.

Figure 8:
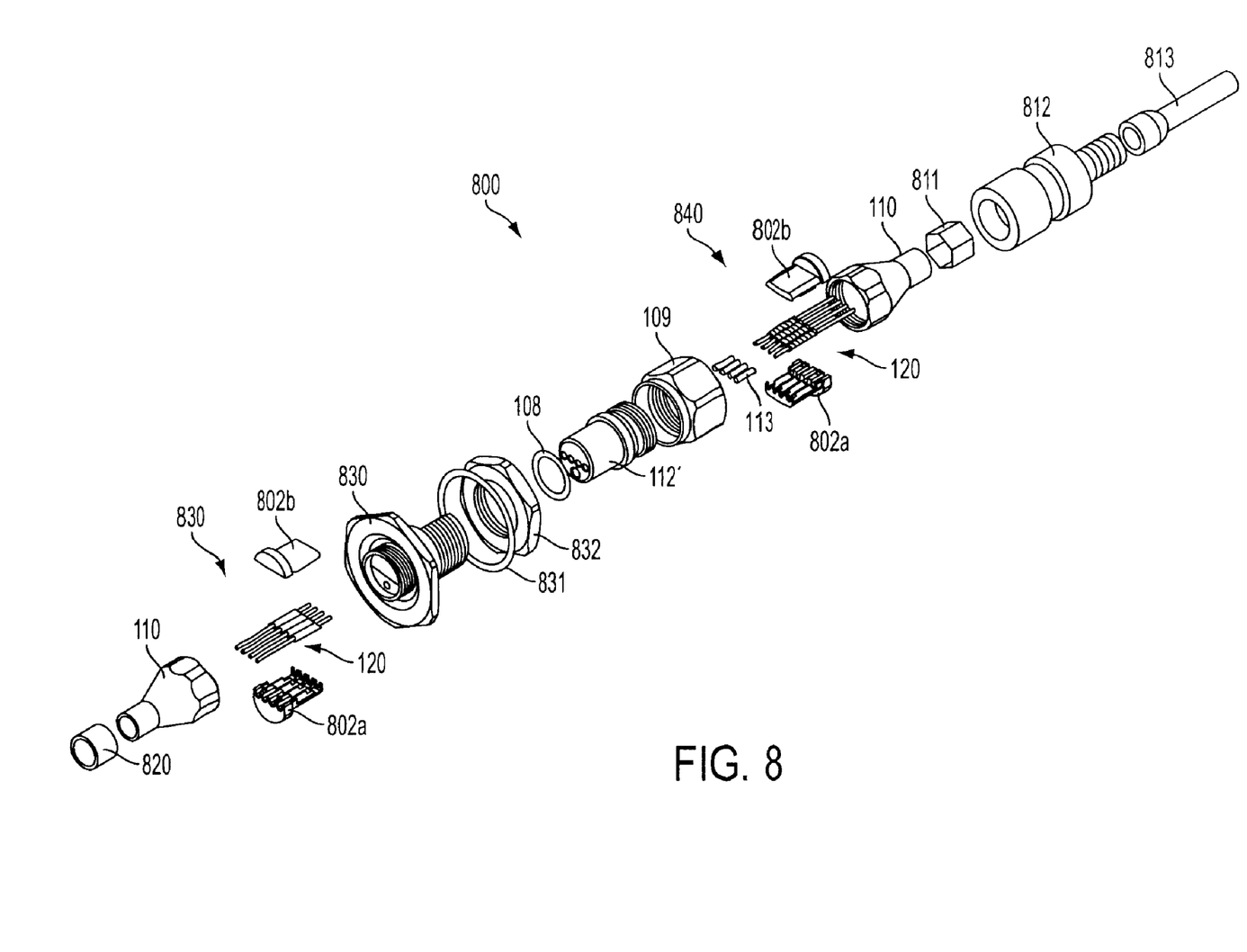
FIG. 8 is an exploded view of a connector assembly including first and second connectors according to a third embodiment of the present invention.
Figure 9A:
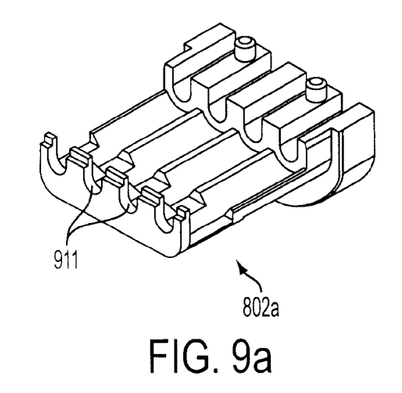
FIGS. 9(a) and 9(b) illustrate a plug assembly according to the third embodiment of the present invention, providing different prospective views of a lower portion of a plug assembly.
Figure 9B:
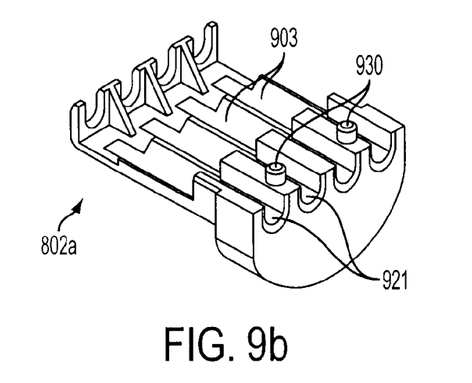
Figure 10A:
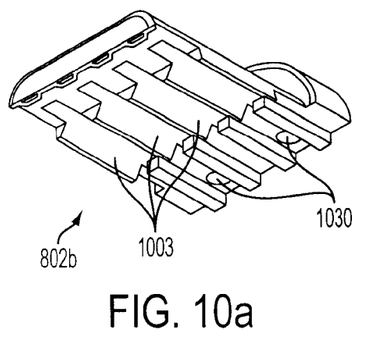
FIGS. 10(a) and 10(b) illustrate the plug assembly of the third embodiment providing different perspective views of an upper portion of the plug assembly.
Figure 10B:
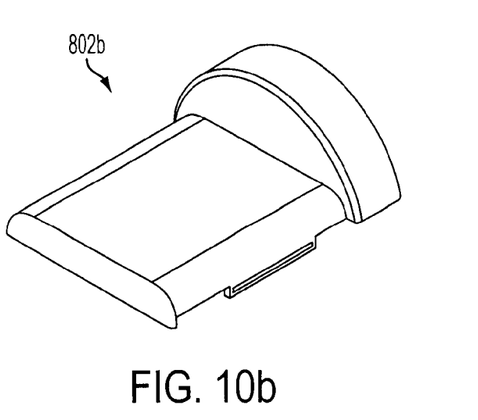
Figure 11A:
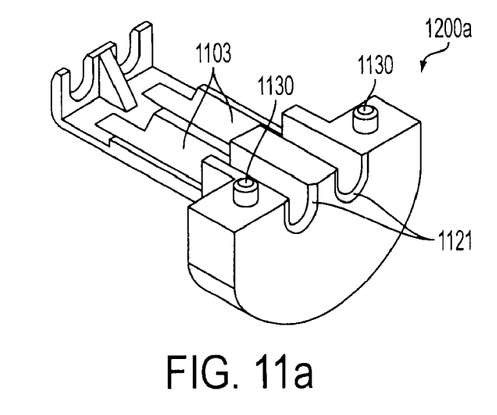
FIGS. 11(a) and 11(b) illustrate a plug assembly for two connections according to a fourth embodiment of the present invention, providing different perspective views of a lower portion of a plug assembly.
Figure 11B:
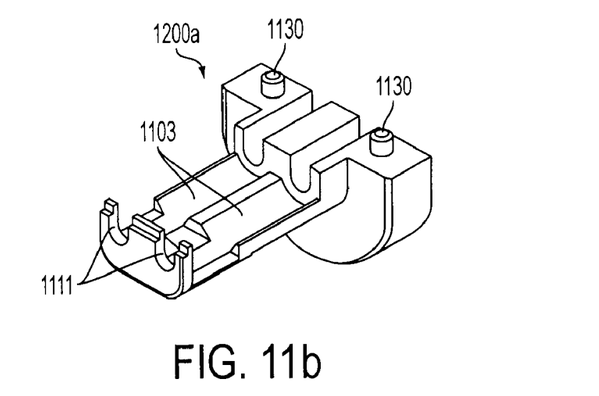
Figure 12A:
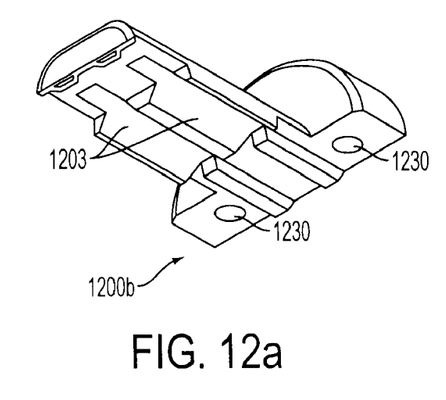
FIGS. 12(a) and 12(b) illustrate the plug assembly of the fourth embodiment providing different perspective views of an upper portion of the plug assembly.
Figure 12B:
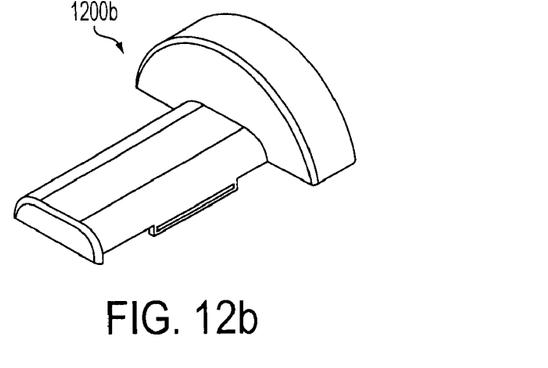
Figure 13A:
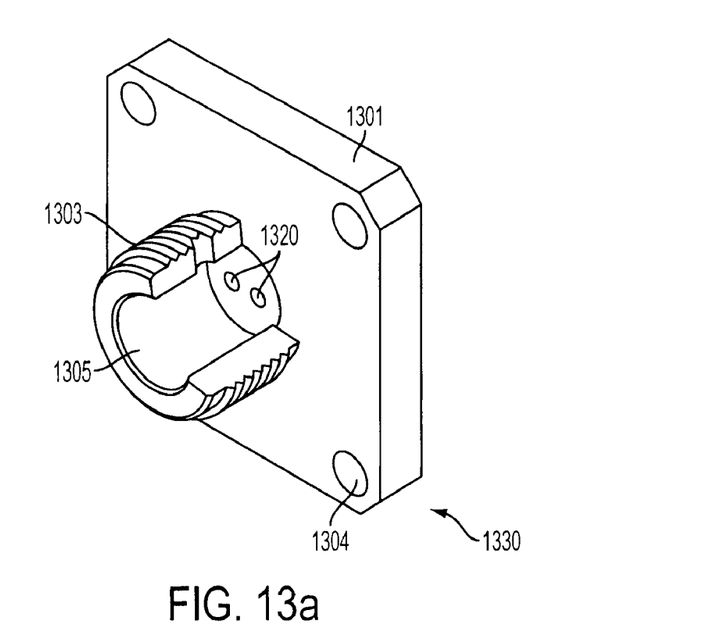
FIGS. 13(a) and 13(b) illustrate a receptacle for the two connection embodiment, providing different perspective views and sides of the receptacle.
Figure 13B:
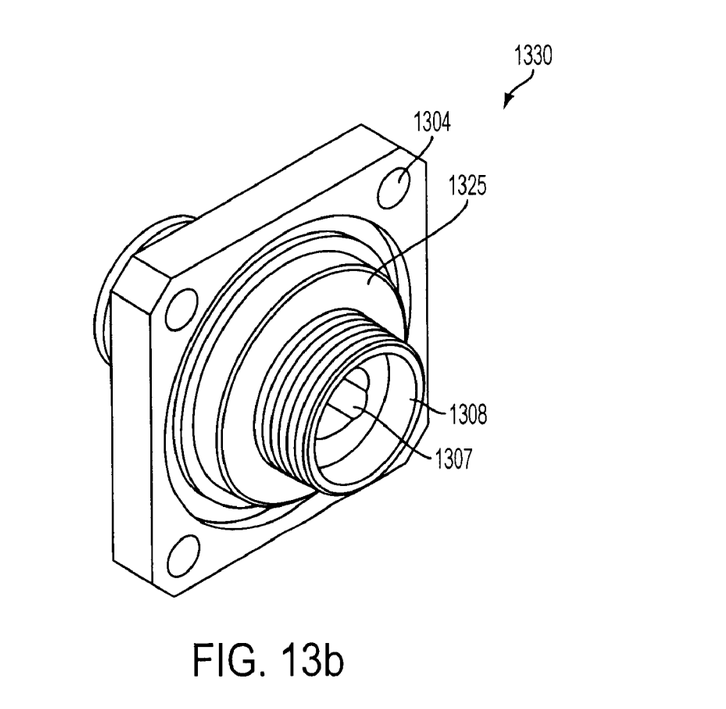

Referring to FIG. 8, a connector assembly 800 including first and second connectors 840 and 830 in accordance with a second embodiment is illustrated. The fiber optic subassemblies 120 are prepared as discussed above. Guide sleeves 113 may be assembled to the fiber optic subassemblies 120 in the same manner as discussed above. The first connector 840 is preferably a plug connector. Each subassembly 120 is inserted into a plug housing having a lower portion 802a and an upper portion 802b forming the plug assembly 840. The lower portion 802a of the plug assembly 840, as illustrated in FIGS. 9(a) and 9(b), has channels 903 that receive the individual fiber optic subassemblies 120. The shape of the channels 903 allow for the spring loaded movement of the ferrule ends 103 of the fiber optic subassemblies 120 as discussed above. The ferrule ends 103 are received by the apertures 911 at one end of the plug housing, which may be raised, and the fiber ends of the fiber optic subassemblies 120 are received by the apertures 921 at the other end of the plug housing. After the fiber optic subassemblies 120 are inserted into the lower portion of the plug assembly 840, an upper portion 802b of the plug assembly is coupled to the lower portion 802a by inserting alignment posts 930 into alignment holes 1030 of the upper portion 802b. The upper portion 802b includes corresponding channels 1003.

As described above with respect to the first embodiment, the backshell 110 holds the plug assembly 840 in place and attaches to the connector body 112' through a threaded connection. The ferrule ends 103 of the fiber optic subassemblies 120, which extend beyond the assembly 840, pass through the horizontally aligned holes of the connector body front piece 112'.

Figure 14:
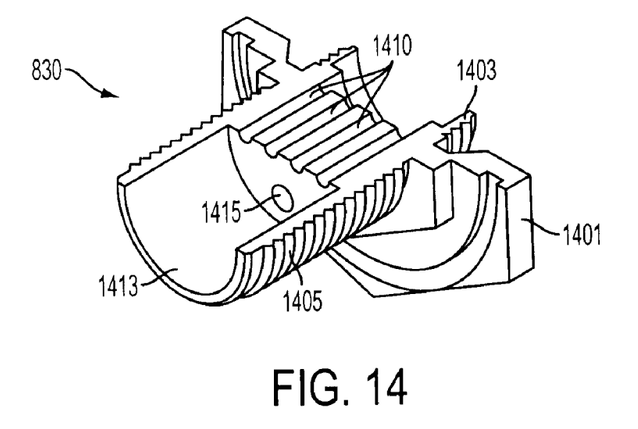
FIG. 14 illustrates a receptacle for a four connection embodiment.
Figure 15A:
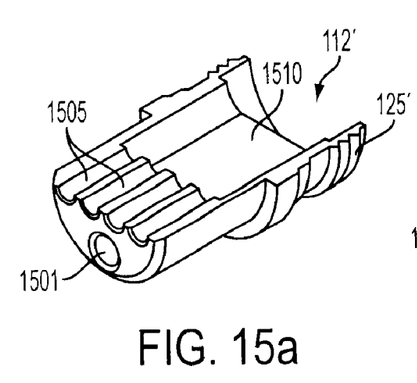
FIG. 15(a) illustrates a connector body for a fourth connection embodiment providing a partial cutaway view.
Figure 15B:
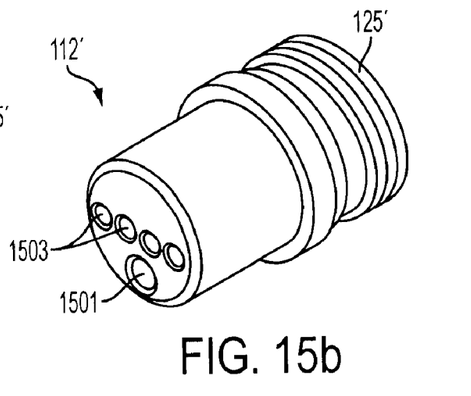
FIG. 15(b) is a plan view of the connector body of FIG. 15(a)
Figure 16A:
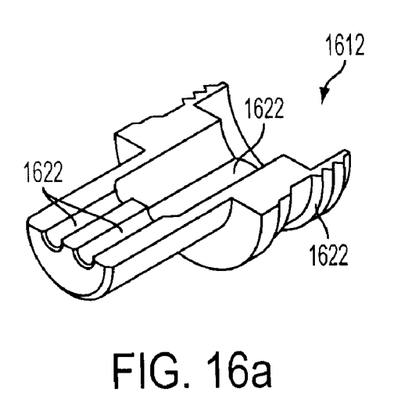
FIG. 16(a) illustrates a connector body for the two connection embodiment providing a partial cutaway view.
Figure 16B:
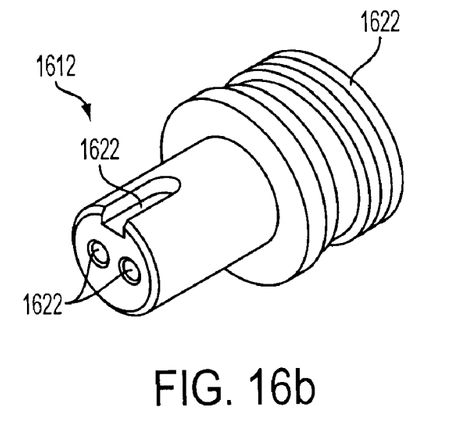
FIG. 16(b) is a plan view of the connector body of FIG. 16(a).

As shown in FIG. 8, the plug assembly 840 is inserted into the second connector 830, such as a receptacle. The receptacle 830 is similar to plug assembly 840 including lower and upper portions 802a and 802b forming an assembly. The receptacle assembly 830 does not include guide sleeves 113, unlike plug assembly 840. The receptacle 830 may have notches 1410 (FIG. 14) to receive the plug assembly 840. The receptacle 830 has a front portion 1413 (FIG. 14) that receives a circular portion of the connector body 112'. An alignment hole 1415 can receive a dowel (not shown) that is also received in an alignment hole 1501 (FIG. 15(a)) in the connector body 112'. A threaded portion 1405 allows for threaded connection to the threaded washer 832 through the O-ring 831 and mating nut 109. Another threaded portion 1403 allows for threaded attachment to the backshell 110. The arimid fibers of the cable are layed over the back portion of the backshell 110 and crimp rings 811 and 820 on either end of the connector assembly are crimped into place to strain relief the cable. Additional coupling attachments 812 and 813 can also be used to provide a proper connection to the cable.

In an alternate embodiment for the connectors, two connections may be accomplished through the assembly illustrated in FIGS. 11(a), 11(b), 12(a), and 12(b). The lower portion 1200a of the assembly has two channels 1103, where the ferrule ends 103 are accommodated by the openings 1111 at one end of the housing and the fiber ends in the openings 1121 at the other end of the housing. The upper portion 1200b holds the fiber optic subassemblies 120 in place through corresponding channels 1203 and is aligned with the lower portion 1200a using the alignment posts 1130 which are received in the alignment holes 1230. In preferred embodiments, the two connection assembly, once assembled, may have an outer circumference that is close to that of the four connection assembly, so that either can be accommodated by the coupling nut 109. Thus, prior to the attachment, the coupling nut 109 is fitted to an outer ridge of the plug assembly of FIGS. 11(a), 11(b), 12(a) and 12(b), such that it cannot pass the outer ridge.

FIGS. 13(a), 13(b), 16(a) and 16(b) illustrate alternate embodiments of the two connection embodiments of FIGS. 11(a), 11(b), 12(a) and 12(b). The two connection body piece 1612 has a loading portion 1622 and openings 1622 for receiving the ferrule portions. The two connection body piece 1612 also has an alignment notch 1622 to achieve proper alignment with the opening 1305 of the receptacle 1330. The receptacle 1330 has mounting holes 1304 on the main plate 1301, which has two holes 1320 for receiving the ferrule ends. The threaded portion 1303 which connects to a nut, such as 832, and another threaded portion 1308, which connects to a backshell 110. Another plug assembly is received in the hole 1307 to achieve the coupling of the fibers.

While not explicitly illustrated, portions of all of the discussed embodiments may be used in conjunction with any of the embodiments. For example, the protective guide cap subsection 130 may be used with the connector embodiment illustrated in FIG. 8, although not illustrated. Similarly, the connectors with the fiber connections laid out in a grid are similar in construction to the rear plug 102 and the front plug 101 assemblies, but grid arrays can also be accomplished through plug assemblies similar in design to the upper and lower portions 802*a* and 802*b*, where layers of fiber optic subassemblies 120 are sandwiched between portions thereof.

While preferred embodiments have been set forth in detail above, those skilled in the art will readily appreciate that other embodiments can be realized within the scope of the invention. It should be noted that while portions and parts are referred to as first, second, top, bottom, front, back, etc., the parts can be used in different orientation and can often be used interchangeably.

What is claimed is:

1. A fiber optic connector for connecting a plurality of optical fibers, comprising of:
    a plurality of fiber optic assemblies, each assembly including at least one optical fiber coupled to a ferrule, said ferrule being coupled to a spring; and
    a connector housing configured to support said plurality of optical fibers, said connector housing including,
    first and second mating connector portions, each of said first and second mating connector portions having
    a plurality of channels extending between first and second ends of said first and second mating connector portions for supporting each of said plurality of fiber optic assemblies, respectfully, each of said plurality of channels having a substantially U-shaped cross-section, said first end of said first mating connector portion being raised and said second end of said first mating connector portion having at least one alignment member, said first and second ends of said second mating connector portion corresponding to said first and second ends of said first mating connector portion, respectively, said second end of said second mating connector portion having at least one mating alignment member corresponding to said alignment member of said first mating connector portion, a plurality of apertures in at least one of said first and second ends of said first and second mating connector portions,
    wherein said plurality of fiber optic assemblies are supported between said first mating connector portion and said second mating connector portion by the channels such that each of said springs are disposed between said first and second mating connector portions and each of said ferrules of said plurality of fiber optic assemblies extend through said apertures of said connector housing in a spring loaded fashion.

2. A fiber optic connector according to claim 1, further comprising
    a backshell configured to receive said plurality of fiber optic assemblies which extend from said connector housing.

3. A fiber optic connector according to claim 1, further comprising
    a socket into which said connector housing is inserted.

4. A fiber optic connector according to claim 1, wherein said apertures are arranged next to one another in a row.

5. A fiber optic connector according to claim 4, wherein said apertures are arranged in a grid pattern.

6. A fiber optic connector according to claim 1, wherein
    said alignment member of said first mating connector portion is an alignment post and said mating alignment member of said second mating connector portion is an alignment hole.

7. A fiber optic connector according to claim 1, wherein
    each of said plurality of fiber optic assemblies includes a ceramic ferrule and, a ferrule holder with a shoulder stop therebetween, and a tube over which said spring is disposed.

8. A fiber optic connector according to claim 1, wherein
    at least one of said plurality of channels accommodates an electrical conductor.

9. A fiber optic connector according to claim 1, further comprising
    a connector body piece, said connector body piece having a configuration of apertures corresponding to said apertures in said connector housing and configured to receive said ferrules of said plurality of fiber optic assemblies extending through the apertures.

10. A fiber optic connector according to claim 9, further comprising
    a backshell configured to receive said plurality of fiber optic assemblies and second mating connector portions and configured to threadably engage and connect to a threaded portion of said connector body piece.

11. A fiber optic connector according to claim 1, further comprising
    at least one insert having apertures corresponding to said apertures in said connector housing and configured to receive said ferrules of said plurality of fiber optic assemblies.

12. A fiber optic connector as according to claim 11, wherein
    said at least one insert is readily removable from said fiber optic connector to allow for cleaning of the ends of the ferrules.

13. A fiber optic connector according to claim 1, wherein said connector housing is a plug housing.

14. A fiber optic connector according to claim 1, wherein
    each of said first and second mating connector portions having a main section, said main section having a substantially flat outer surface.

15. A fiber optic connector according to claim 14, wherein
    each of said second ends of said first and second mating connector portions has a substantially curved outer surface.

16. A fiber optic connector according to claim 14, wherein
    said second ends of said first and second mating connector portions abut one another to form an end of said connector housing.

* * * * *